(12) United States Patent
Kim et al.

(10) Patent No.: US 10,393,937 B2
(45) Date of Patent: Aug. 27, 2019

(54) BACKLIGHT UNIT AND DISPLAY DEVICE HAVING THE SAME

(71) Applicant: LG Display Co., Ltd., Seoul (KR)

(72) Inventors: JaeJin Kim, Goyang-si (KR); MinSoo Park, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/847,613

(22) Filed: Dec. 19, 2017

(65) Prior Publication Data

US 2018/0180790 A1    Jun. 28, 2018

(30) Foreign Application Priority Data

Dec. 26, 2016    (KR) .......................... 10-2016-0179403

(51) Int. Cl.
*F21V 7/04*    (2006.01)
*F21V 8/00*    (2006.01)
*G02F 1/1335*    (2006.01)

(52) U.S. Cl.
CPC ......... *G02B 6/0016* (2013.01); *G02B 6/0036* (2013.01); *G02B 6/0038* (2013.01); *G02B 6/0068* (2013.01); *G02F 1/133615* (2013.01)

(58) Field of Classification Search
CPC ... G02B 6/0068; G02B 6/0055; G02B 6/0061
USPC ....................................................... 362/613
See application file for complete search history.

(56) References Cited

U.S. PATENT DOCUMENTS

| | | | | |
|---|---|---|---|---|
| 6,123,431 | A * | 9/2000 | Teragaki | G02B 6/0038 |
| | | | | 362/333 |
| 2003/0227768 | A1 | 12/2003 | Hara et al. | |
| 2008/0309849 | A1 * | 12/2008 | Yang | G02B 6/0028 |
| | | | | 349/65 |
| 2012/0140443 | A1 * | 6/2012 | Kim | G02B 6/0021 |
| | | | | 362/97.1 |
| 2017/0045199 | A1 * | 2/2017 | Kim | G02F 1/133605 |
| 2017/0336551 | A1 * | 11/2017 | Chang | G02B 6/0036 |
| 2018/0128964 | A1 * | 5/2018 | Bae | G02B 6/0055 |

OTHER PUBLICATIONS

Extended European Search Report issued in European Patent Application No. 17208483.2 dated Feb. 26, 2018.

* cited by examiner

*Primary Examiner* — Ahshik Kim
(74) *Attorney, Agent, or Firm* — Polsinelli PC

(57) ABSTRACT

The present disclosure relates to a backlight unit and a display device including the backlight unit. The backlight unit includes a first pattern in a first region of a light guide plate including a light incidence surface and a second pattern in a second region of the light guide plate extending from the first region, so that, in the first region, a directional angle of light can be improved so as to prevent the occurrence of hot spots, and in the second region, a line light source can be converted into a plane light source.

20 Claims, 15 Drawing Sheets

BACKLIGHT UNIT AND DISPLAY DEVICE HAVING THE SAME

CROSS REFERENCE TO RELATED APPLICATION

This application claims priority from Korean Patent Application No. 10-2016-0179403, filed on Dec. 26, 2016, which is hereby incorporated by reference in its entirety for all purposes as if fully set forth herein.

BACKGROUND

Field of the Disclosure

The present disclosure relates to a display device, and more particularly, to a backlight unit and a display device including the backlight unit.

Description of the Background

In general, a liquid crystal display (LCD) device is a type of flat panel display that displays images using the electrical and optical characteristics of liquid crystal, which has intermediate properties between liquids and solids. Since the LCD device is thin and light compared to other display devices and the power consumption and the driving voltage of the LCD device are low, the LCD device has been widely applied and used in various industries.

Meanwhile, because the LCD device is a non-luminescent element that emits light due to external factors, the LCD device requires a separate light source. Accordingly, a backlight unit having a light source is provided on the rear surface of a liquid crystal panel to project light toward the front of the liquid crystal display device. The light is diffused while passing through a plurality of optical sheets, and is condensed by the liquid crystal panel, thereby being implemented as an identifiable image.

In general, the backlight unit of an LCD device is classified into an edge-type backlight unit or a direct-type backlight unit depending on the arrangement of a light-emitting lamp used as a light source.

The direct-type backlight unit includes a plurality of lamps, which are arranged in a row on the rear surface of a liquid crystal panel and directly projects light onto the front surface of the liquid crystal panel. The edge-type backlight unit includes a light source that is provided outside a light guide plate that guides light, in which the light emitted from the light source is incident on the entire surface of the liquid crystal panel using the light guide plate.

In the edge type backlight unit, since the light source is disposed at the edge of the light guide plate, one region of the light guide plate is located adjacent to the light source, and another region is located far away from the light source. Therefore, a large amount of light is supplied to the one region of the light guide plate, which is located adjacent to the light source, but a small amount of light is supplied to the other region, which is located far away from the light source. Thus, there is a problem in that the light is not uniformly emitted from the front surface of the light guide plate, and as a result, a portion is darker or brighter than the other portion, and dark portions, i.e. hot spots, occur.

SUMMARY

The present disclosure has been made to solve the above-described problems, and provide a backlight unit capable of preventing the occurrence of hot spots in a light inlet portion and a display device including the backlight unit.

According to an aspect of the disclosure, a backlight unit includes a light guide plate including at least one first region including a light incidence surface and a second region extending from the first region. According to an aspect, the backlight unit includes a light source assembly including a plurality of light sources disposed on at least one side of the light guide plate adjacent to the first region. According to an aspect, each of the first region and the second region may include a plurality of first patterns and a plurality of second patterns arranged in a direction in which the plurality of light sources is arranged, the first patterns and the second patterns may be engraved patterns, and the depth of the first patterns may be deeper than the depth of the second patterns.

Further, according to another aspect, a display device includes a display panel. According to another aspect, the display device includes a light guide plate disposed on the rear surface of the display panel and including at least one first region including a light incidence surface and a second region extending from the first region. According to another aspect, the display device includes a light source assembly that includes a plurality of light sources disposed on at least one side of the light guide plate adjacent to the first region. According to another aspect, each of the first region and the second region may include a plurality of first patterns and a plurality of second patterns arranged in a direction in which the plurality of light sources is arranged, the first patterns and the second patterns may be engraved patterns, and the depth of the first patterns may be deeper than the depth of the second patterns.

According to aspects disclosed herein, a backlight unit and a display device including the backlight unit are provided with a first pattern in a first region of a light guide plate including a light incidence surface, and a second pattern in a second region of the light guide plate extending from the first region. As a result, in the first region, the directional angle of light can be improved so as to prevent the occurrence of hot spots, and in the second region, a line light source can be converted into a plane light source.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

Figure 1:
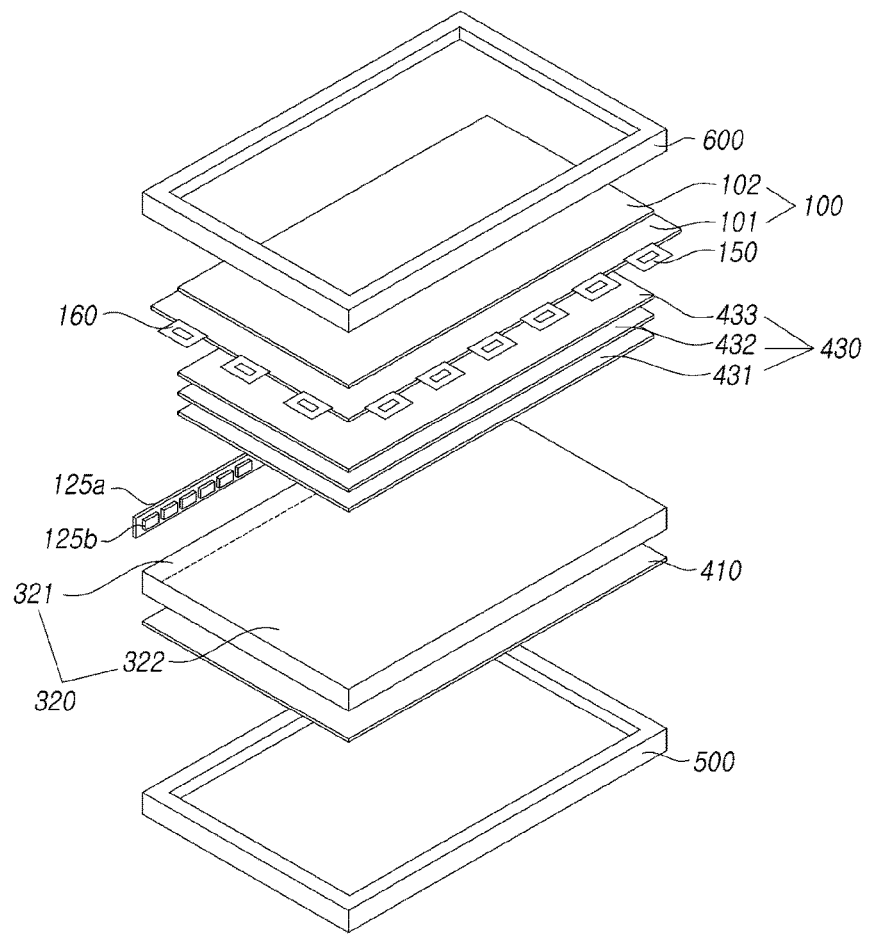
FIG. 1 is an exploded perspective view schematically illustrating a structure of a display device according to a first aspect of the present disclosure.

Hereinafter, aspects of the present disclosure will be described in detail with reference to the accompanying drawings. The following aspects are provided, by way of example, so that the idea of the present disclosure can be sufficiently transferred to those skilled in the art. Therefore, the present disclosure is not limited to the aspects as described below, and may be embodied in other forms. Also, in the drawings, the size, thickness, and the like of a device may be exaggeratedly represented for the convenience of description. Throughout the specification, the same reference numerals designate the same elements.

The advantages and features of the present disclosure and methods of achieving the same will be apparent by referring to aspects of the present disclosure as described below in detail in conjunction with the accompanying drawings. However, the present disclosure is not limited to the aspects set forth below, but may be implemented in various different forms. The following aspects are provided only to completely disclose the present disclosure and inform those skilled in the art of the scope of the present disclosure, and the present disclosure is defined only by the scope of the appended claims. Throughout the specification, the same or like reference numerals designate the same or like elements. In the drawings, the dimensions and relative sizes of layers and regions may be exaggerated for the convenience of description.

When an element or layer is referred to as being "above" or "on" another element, it can be "directly above" or "directly on" the other element or layer or intervening elements or layers may be present. In contrast, when an element is referred to as being "directly on" or "directly above" another element or layer, there are no intervening elements or layers present.

Spatially relative terms, such as "below", "beneath", "lower", "above", "upper" and the like, may be used herein for ease of description to describe one element or feature's relationship to another element(s) or feature(s) as illustrated in the figures. It will be understood that the spatially relative terms are intended to encompass different orientations of the element in use or operation in addition to the orientation depicted in the figures. For example, if the element in the figures is turned over, elements described as "below" or "beneath" other elements would then be oriented "above" the other elements. Thus, the exemplary term "below" can encompass both an orientation of above and below.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

The terms as used herein are merely for the purpose of describing aspects and are not intended to limit the present disclosure. As used herein, singular forms are intended to include plural forms unless the context clearly indicates otherwise. The terms "comprises" and/or "comprising" as used herein refer to the existence of a disclosed component, step, operation, and/or element, and do not exclude the existence of or a possibility of addition of one or more other components, steps, operations, and/or elements.

FIG. 1 is an exploded perspective view schematically illustrating a structure of a display device according to a first aspect of the present disclosure. Referring to FIG. 1, the display device according to the first aspect includes a display panel 100, drive units 150 and 160 configured to drive the display panel 100, and a backlight unit installed on the rear surface of the display panel 100 and configured to emit light over the entire surface of the display panel 100. At this time, at least one drive unit 150 or 160 may be mounted in the display panel 100, but the present aspect is not limited thereto.

Meanwhile, the display panel 100 according to the first aspect may be a liquid crystal display panel. The display panel 100 may include a color filter array substrate 102 and a thin film transistor (TFT) array substrate 101, which are arranged to face each other, and includes a liquid crystal layer interposed between the color filter array substrate 102 and the thin film transistor array substrate 101.

On the display panel 100 in which the color filter array substrate and the thin film transistor array substrate are bonded to each other, a common electrode and a pixel electrode are formed to apply an electric field to the liquid crystal layer. When a voltage of a data signal is applied to the pixel electrode in a state in which another voltage is applied to the common electrode, the liquid crystal of the liquid crystal layer rotates due to dielectric anisotropy according to the electric field between the common electrode and the pixel electrode, so that light is transmitted through or blocked for each pixel so as to display a character or an image.

In addition, in order to control the voltage of the data signal applied to the pixel electrode for each pixel, a switching element, such as a thin film transistor, is individually provided in each pixel. Outside the display panel 100 configured as described above, upper and lower polarization plates (not illustrated) are attached to the display panel 100. The lower polarization plate polarizes the light that has passed through the backlight unit, and the upper polarization plate polarizes the light that has passed through the display panel 100.

More specifically referring to the backlight unit, a light source assembly including a light source array 125b configured to generate light is disposed on at least one side of the light guide plate 320, a reflector 410 is disposed on the rear surface of the light guide plate 320, and the backlight unit may include a plurality of optical sheets 430 disposed on the upper surface of the light guide plate 320. Here, the light source may be a light-emitting diode (LED), but the present aspect is not limited thereto. The display panel 100 and the backlight unit configured as described above are coupled to each other through a fixing member and by a cover bottom 500 at the bottom side and a case top 600 at the top side thereby constituting a display device.

Meanwhile, the plurality of optical sheets 430 may include a diffusion sheet 431 and upper and lower prism sheets 433 and 432, and a protective sheet (not shown) may be further added thereto. The diffusion sheet 431 diffuses the light incident from the light guide plate 320 so as to prevent unevenness, which may be caused when light is partially concentrated, from occurring in an image displayed on the display panel 100, and perpendicularly refracts the light incident from the light guide plate 320. The upper and lower prism sheets 433 and 432 collect the light incident from the diffusion sheet 431 and cause the light to be uniformly distributed on the entire surface of the display panel 100. In addition, the protective sheet may protect the optical sheet 430, which is sensitive to dust or is scratched, and may prevent the optical sheets 430 from moving when the backlight unit is transported.

At this time, the light source assembly is configured with a light source 125b and a light source printed circuit board (PCB) (not illustrated) that drives the light source 125b. Meanwhile, a plurality of light sources may be provided, and may be arranged at regular intervals on the light source PCB, but the present aspect is not limited thereto.

The light emitted from the light source 125b is incident on the side surface of the light guide plate 320, and the reflector 410 disposed on the rear surface of the light guide plate 320 guides the light transmitted to the rear surface of the light guide plate 320 toward the optical sheet 430 on the top surface of the light guide plate 320 so as to allow the light to be emitted toward the display panel 100.

However, since the luminance of each light source 125b is limited and thus, it is necessary to use a plurality of light sources 125b in parallel or in series and in parallel, there is a problem in that the light emitted from the light sources 125b arranged at regular intervals is not uniformly distributed to the light guide plate 320 and the display panel 100. Specifically, the light sources 125b may be arranged at predetermined intervals due to problems such as heat generation and costs.

When the distance between adjacent light sources 125b is long, the distance to which the light incident on the light guide plate 320 to be mixed is insufficient, and as a result, light and dark portions are generated around the light incidence surface of the light guide plate 320 that is close to the light sources 125b. Meanwhile, the light guide plate 320 converts a point light source into a plane light source and supplies light to the display panel 100 disposed on the light guide plate 320. When hot spots occur in the light guide plate 320, a problem may arise in that the light has a shape that is incident in a wave pattern on the light incidence surface of the light guide plate, and the luminance is not uniform over the entire display panel 100 due to the wave pattern.

The present aspect has been made in order to solve this problem, the light, which is incident from the light source assembly through the light guide plate 320, which is configured with a first region 321 including a plurality of first patterns and a second region 322 extending from the first region 321 and including a plurality of second patterns, may be diffused in the light guide plate 320 to be uniformly distributed over the light guide plate 320 and the display panel 100.

Figure 2:
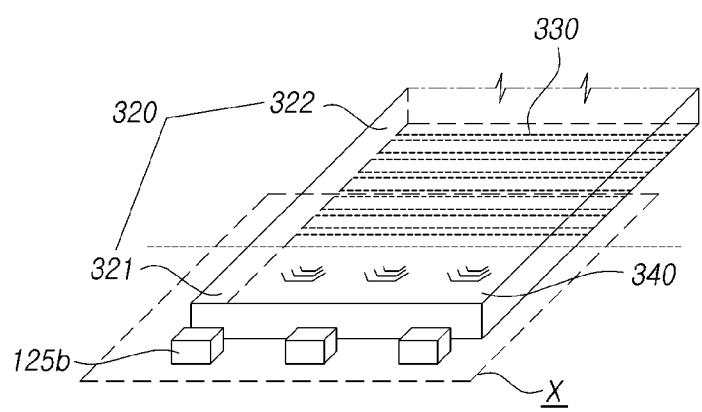
FIG. 2 is a perspective view of a light source and a light guide plate of the backlight unit according to the first aspect.
Figure 3:
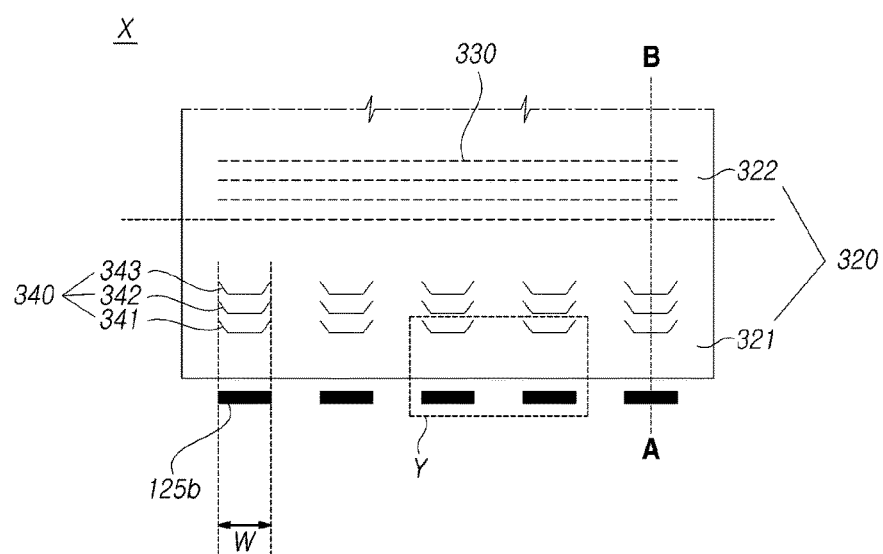
FIG. 3 is an enlarged view of X region in FIG. 2.

This configuration will be described with reference to FIGS. 2 and 3 as follows. FIG. 2 is a perspective view of a light source and a light guide plate of the backlight unit according to the first aspect. FIG. 3 is an enlarged view of X region in FIG. 2.

Referring to FIGS. 2 and 3, the light sources 125b included in the backlight unit according to the first aspect are provided on at least one side of the light guide plate 320. At this time, the light sources 125b may be disposed to be spaced apart from the light guide plate 320.

The light guide plate 320 according to the present aspect is divided into a first region 321 disposed adjacent to the light sources 125b and a second region 322 extended away from the first region 321. Here, the first region 321 may include a light incidence surface through which light is incident on the light guide plate 320 from the light sources 125b.

The first region 321 is provided with a plurality of first patterns 340, and the second region 322 is provided with a plurality of second patterns 330. At this time, the plurality of first patterns 340 and the plurality of second patterns 330 may be provided on the rear surface of the light guide plate 320. Here, the first patterns 340 serve to increase the directional angle of the light incident on the light guide plate 320, and the second patterns 330 serve to convert the line light source incident on the light guide plate 320 into a plane light source.

Specifically, the first patterns 340 may be formed as engraved patterns in the first region 321 of the light guide plate 320, and the second pattern 330 may be formed as engraved patterns in the second region 322 of the light guide plate 320. At this time, the depth of the first patterns 340 may be deeper than the depth of the second patterns 330. Through this, the light incident from the light sources 125b is incident on the first region 321 of the light guide plate 320 and reaches to the first patterns 340 earlier than the second patterns 330 to be diffused over a wider area inside the light guide plate 320.

In addition, the plurality of first patterns 340 may be arranged in a row in the first region 321 of the light guide plate 320 in the same direction as the arrangement direction of the light sources 125b. At this time, since the plurality of first patterns 340 is arranged in the same direction as the arrangement direction of the light sources 125b, the plurality of patterns is arranged in the direction in which the light advances, so that the light can be effectively diffused inside the light guide plate 320.

Meanwhile, one or more grooves may be disposed in one first pattern 340. For example, one first pattern 340 may include a first groove 341 disposed closest to the light sources 125b, a second groove 342 provided on one side of the first groove 341, and a third groove 343 disposed on one side of the second groove 342. In this way, while FIGS. 2 and 3 illustrate a configuration in which the first patterns 340 include the first to third grooves 341, 342, and 343, the aspect is not limited to this, and the first pattern 340 may be configured with at least one groove.

At this time, the widths W and the shapes of the first groove 341, the second groove 342, and the third groove 343 may be the same, but the present aspect is not limited thereto. The widths W of the first groove 341, the second groove 342, and the third groove 343 may be widths based on the direction in which the light sources 125b are arranged.

In addition, the plurality of second patterns 330 disposed in the second region 322 may be arranged to be spaced apart from each other in the same direction as the arrangement direction of the light sources 125b and may also be arranged to be spaced apart from each other in the direction perpendicular to the arrangement direction of the light sources 125b. The second patterns 330 may be formed to have various shapes. For example, the second patterns 330 may have various shapes, such as a line, a curve, a semi-circle, a semi-ellipse, an ellipse, and a polygon.

At this time, the plurality of second patterns 330 causes the light incident on the light guide plate 320 to be irregularly reflected. That is, the second patterns 330 may serve to convert a line light source incident from the light sources 125b into a plane light source.

Meanwhile, the area of the first region 321 of the light guide plate 320 may be smaller than the area of the second region 322. For example, the ratio of the area of the first region 321 relative to the second region 322 may be from 1:25 to 1:50. That is, since the area of the second region 322, which converts a line light source into a plane light source, is greater than that of the first region 321, which diffuses the light, the light can be uniformly diffused inside the light guide plate 320, and the incident light can be output in the direction of the display panel at a uniform luminance.

Meanwhile, in the first patterns 340 according to the first aspect of the present disclosure, one first pattern 340 may be disposed in the first region of the light guide plate 320 to correspond to one light source 125b. Also, the first to third grooves 341, 342, and 343 of the first patterns 340 may have a shape that becomes wider toward an end. In this way, when one of the first patterns 340 is disposed to correspond to one light source 125b, the light incident from each of the light sources 125b can be diffused without loss, and when the first through third grooves 341, 342, and 343 are formed in a trapezoidal shape, reflection of light occurs at the boundaries of the respective grooves 341, 342, and 343, so that the directional angle of the light incident on the light guide plate 320 can be increased.

Figure 4:
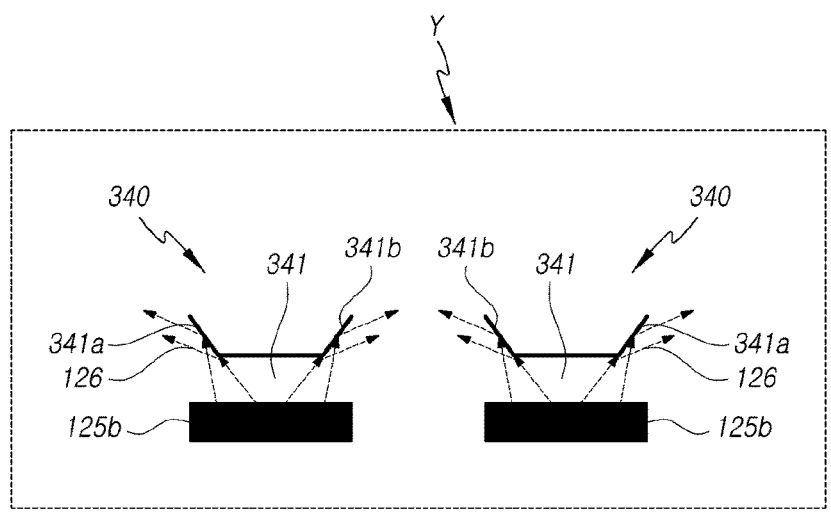
FIG. 4 is an enlarged view of Y region in FIG. 3.

This principle will be described with reference to FIG. 4. FIG. 4 is an enlarged view of Y region in FIG. 3. A light path in the light guide plate, which is formed by the first pattern according to the first aspect, will be discussed with reference to FIG. 4. In FIG. 4, a configuration in which one first pattern has one groove will be mainly described for the convenience of description.

Referring to FIG. 4, the first pattern 340 according to the first aspect includes at least one groove 341, and one light source 125b may be disposed to correspond to the at least one groove 341.

The at least one groove 341 may have a trapezoidal shape. For example, at least one groove 341 may have a trapezoidal shape in a plan view in which a long portion in the horizontal direction (transverse direction) is open.

At this time, in the groove 341, the shorter portion in the horizontal direction (transverse direction) may be positioned closer to the light source 125b than the longer portion in the horizontal direction (transverse direction). Through this, the light incident on the light guide plate from the light source 125b is reflected by the first pattern 340, and the reflected light is refracted by the shape of the first pattern 340.

Specifically, the light 126 incident on the light guide plate from the light source 125b reaches the groove 341 of the first pattern 340 provided in the first region of the light guide plate. Here, air may be present in the groove 341. The light 126, which reaches to the groove 341, is reflected from the interface between the groove 341 and the air due to the refractive index difference, and at the same time, the path of the light 126 is changed, so that the light 126 reaches the side surfaces 341a and 341b of the groove 341 of the first pattern 340. Meanwhile, when one first pattern 340 is provided with at least two grooves 341, the light 126, the path of which is changed to the side surfaces 341a and 341b of the groove 341, reaches to an interface between another groove (not illustrated) forming one first pattern 340, and the phenomenon in which the light 126 is reflected from the interface between another groove (not illustrated) and the air while the path of the light is simultaneously changed may be repeated.

As described above, the path of the light 126 incident on the light guide plate is changed by the first pattern 340, and as a result, the directional angle of the light 126 increases, thereby preventing the occurrence of hot spots.

Figure 5:
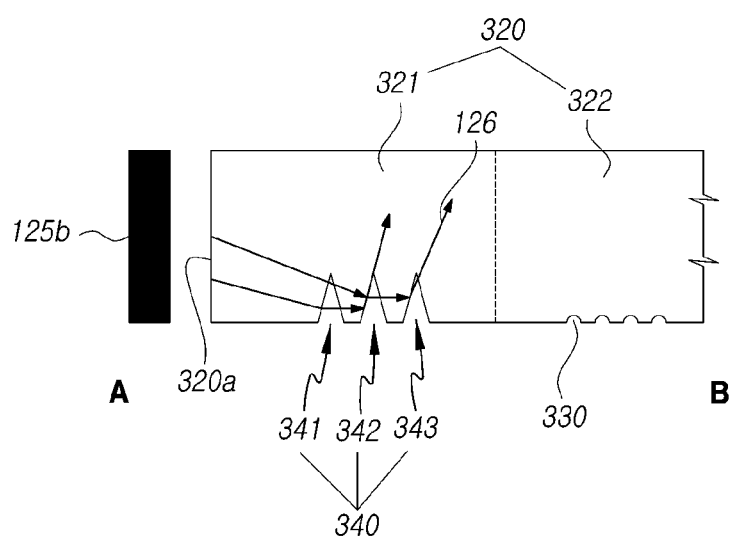
FIG. 5 is a cross-sectional view taken along line A-B in FIG. 3.

This principle will be described in more detail below. FIG. 5 is a cross-sectional view taken along line A-B in FIG. 3.

Referring to FIG. 5, light 126 is incident on a light incidence surface 320a of a light guide plate 320 according to the present aspect from a light source 125b. The incident light 126 reaches to a first groove 341 of a first pattern 340 disposed in a first region 321. Upon reaching to the first groove 341, the light 126 is reflected from the interface between the first groove 341 and the air and is subjected to a change in the advance path. The light 126, the path of which is changed, reaches to an interface between a second groove 342 of the first pattern 340 and the air. Upon reaching to the interface between the second groove 342 and the air, the light 126 is reflected and the path of the light 126 is changed. The light, the path of which is changed, reaches to an interface between a third groove 343 of the first pattern 340 and the air, and is reflected from the interface.

That is, the light 126 incident on the light guide plate 320 is reflected and refracted by the plurality of first patterns 340 provided in the first region 321 including the light incidence surface 320a, so that the directional angle of the light can be expanded compared to the case where the first patterns 340 do not exist.

More specifically, the light 126 emitted from the light source 125b can be incident on the light guide plate 320 while having a predetermined directional angle, and a portion may exist, in which light emitted from another light source 125b disposed adjacent to the light source 125b and the light 126 are not mixed with each other. However, in the present aspect, the light emitted from the light source 125b is reflected and refracted by the plurality of first patterns 340 and is subjected to a change in the advance path. Consequently, the directional angle of the light 126 incident on the light guide plate 320 may be increased. Therefore, it is possible to prevent the occurrence of hot spots in the light guide plate 320, and hence, the light guide plate 320 can provide light having a uniform luminance to the display panel.

In addition, the light 126 emitted from the light source 125b meets the first groove 341 of the first pattern 340 such that the directional angle of the light 126 is increased, and the light 126 having the increased directional angle meets the second groove 342 such that the directional angle of the light 126 may become larger than the directional angle increased through the first groove 341. In addition, the light 126 having the directional angle increased through the second groove 342 may meet the third groove 343 such that the directional angle of the light 126 can be further increased. That is, the directional angle of the light 126 can be adjusted by adjusting the number of grooves of the first patterns 340.

The light 126 having a directional angle increased by the first patterns 340 may reach to the second region 322 of the light guide plate 320, and may be diffused in the light guide plate by second patterns 330 in the second region 322. That is, the light 126 having a directional angle increased by the first pattern 340 meets the second patterns 330 and is thus scattered, so that the light can uniformly reach to the inside of the light guide plate 320.

Meanwhile, the shape and structure of the first patterns according to the present aspects are not limited to the shapes and structures shown in FIGS. 2 to 5, and may be variously formed. This will be described below with reference to FIGS. 6 to 12.

Figure 6:
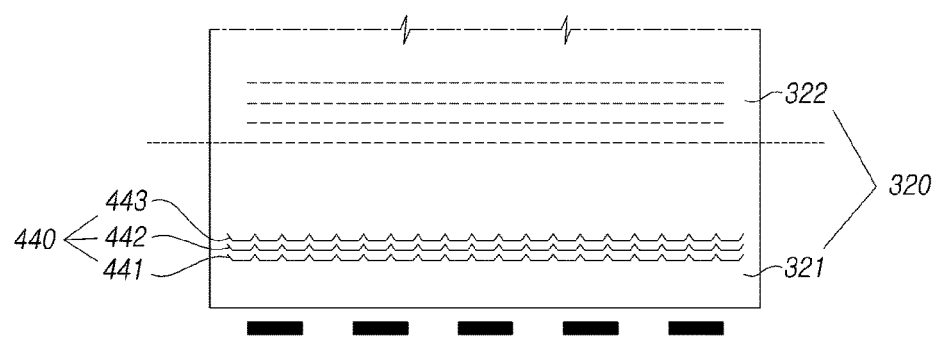
FIG. 6 is a plan view illustrating a portion of a light guide plate and light sources according to a second aspect.

FIG. 6 is a plan view illustrating a portion of a light guide plate and light sources according to a second aspect. The display device illustrated in FIG. 6 may include the similar components as those of the above-described aspect. Similar descriptions of the above-described aspects may be omitted. Similar components may be denoted by the same reference numerals.

Referring to FIG. 6, the light guide plate 320 according to the second aspect includes a first region 321 including a light incidence surface and a second region extended away from the first region 321. Here, the first region 321 may include a first pattern 440.

Here, the first pattern 440 may include a first groove 441 disposed closest to the light sources 125b, a second groove 442 disposed on one side of the first groove 441, and a third groove 443 disposed on one side of the second groove 442.

At this time, the first groove 441 may be connected to another first groove 441 in the same direction as the alignment direction of the plurality of light sources 125b. In addition, the second groove 442 may be connected to another second groove 442 in the same direction as the alignment direction of the plurality of light sources 125b. Further, the third groove 443 may also be connected to another third groove 443 in the same direction as the alignment direction of the plurality of light sources 125b. Through this, since most of the light incident from the plurality of light sources 125b meets the first patterns 440, the directional angle of most of the light incident on the light guide plate 320 can be improved.

In the present aspect, at least two first patterns 340 may correspond to one light source 125b. When a plurality of first patterns 340 correspond to one light source 125b as described above, the number of times the light incident on the light guide plate 320 from the light source 125b meets the first patterns 340 may be increased. Therefore, the directional angle of the light incident from the light source 125b to the light guide plate 320 can be further increased.

Figure 7:
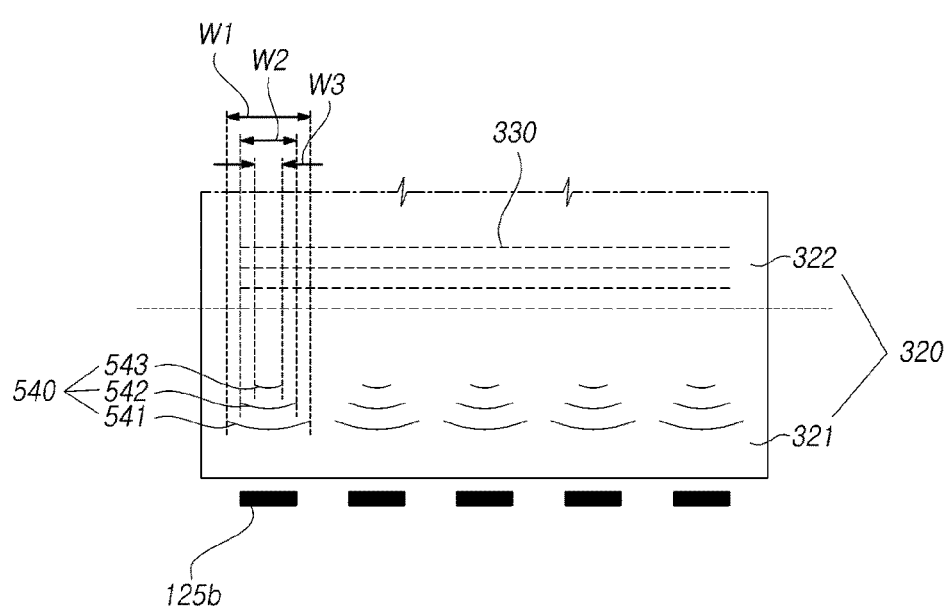
FIG. 7 is a plan view illustrating a portion of a light guide plate and light sources according to a third aspect.
Figure 8:
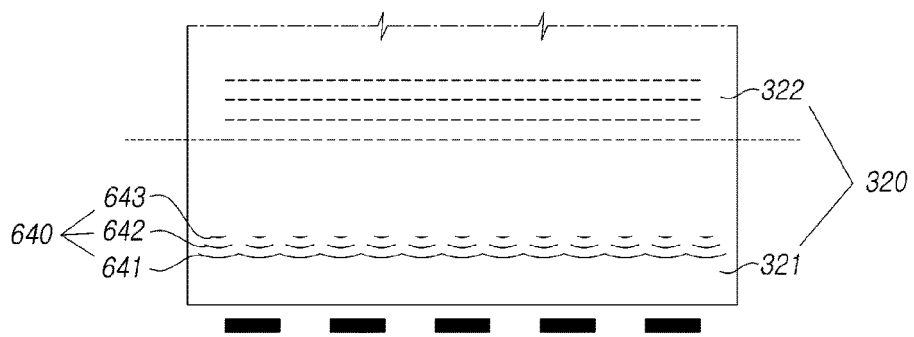
FIG. 8 is a plan view illustrating a portion of a light guide plate and light sources according to a fourth aspect.
Figure 9:
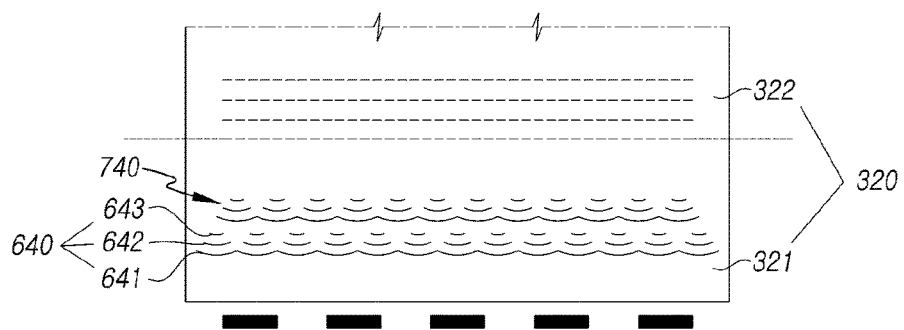
FIG. 9 is a plan view illustrating a portion of a light guide plate and light sources according to a fifth aspect.

Subsequently, first patterns according to other aspects will be discussed below. FIG. 7 is a plan view illustrating a portion of a light guide plate and light sources according to a third aspect. FIG. 8 is a plan view illustrating a portion of a light guide plate and light sources according to a fourth aspect. FIG. 9 is a plan view illustrating a portion of a light guide plate and light sources according to a fifth aspect.

The display device illustrated in FIGS. 7 to 9 may include similar components as those of the above-described aspects. Similar descriptions of the above-described aspects may be omitted. Similar components may be denoted by the same reference numerals.

First, referring to FIG. 7, a first pattern 540 according to a third aspect may include a first groove 541 positioned closest to the light sources 125b, a second groove 542 positioned on one side of the first groove 541, and a third groove 543 positioned on one side of the second groove 542.

In addition, one first pattern 540 according to the third aspect may be disposed to correspond to one light source 125b. In addition, one first pattern 540 may be disposed to be spaced apart from another neighboring first pattern 540.

At this time, each of the first groove 541, the second groove 542, and the third groove 543 may have a concavely curved shape in a plan view, but the present aspect is not limited thereto. Specifically, the first groove 541, the second groove 542, and the third groove 543 may have different widths. More specifically, the width W1 of the first groove 541 may be formed to be larger than the width W2 of the second groove 542, and the width W2 of the second groove 542 may be formed to be larger than the width W3 of the third groove 543. That is, the width W1 of the first groove 541 may be the largest, and the width W3 of the third groove 543 may be the smallest. In other words, it may be sufficient to configure the first pattern 540 such that among the plurality of grooves forming the first pattern 540, a groove disposed closer to the light sources 125b has a greater width and a groove disposed farther away from the light sources 125b has a smaller width.

Through this, the light incident on the light guide plate 320 from the light sources 125b reaches to the interface between the first groove 541 of the first pattern 540 and the air, thereby being reflected and refracted, so that the directional angle of the light can be improved. At this time, since the width W1 of the first groove 541 is larger than the widths of the other grooves, the advance path of the light incident on the light guide plate 320 from the light sources 125b can be changed most greatly by the first groove 541, and the second grooves 542 and the third grooves 543 may serve to change the path of light, the path of which is not changed by the first grooves 541, or to further increase the directional angle of the light, the path of which has been changed by the first groove 541 so as to have an increased directional angle.

Upon comparing FIG. 8 with FIG. 7, one light source 125b may be disposed to correspond to a plurality of first patterns 640. As described above, according to the fourth aspect, by arranging the plurality of first patterns 640 to correspond to one light source 125b, the first patterns 640 according to the fourth aspect may be smaller in size than the first patterns according to the third aspect.

In addition, the first patterns 640 according to the fourth aspect may be connected to other first patterns 640 in the same direction as the arrangement direction of the plurality of light sources 125b. Specifically, a first groove 641 and another adjacent first groove 641 may be connected to each other. Meanwhile, although FIG. 8 illustrates a configuration in which only the adjacent first grooves 641 are connected to each other, the present aspect is not limited thereto. For example, a second groove 642 and another adjacent second groove 642 may be connected to each other. Specifically, a third groove 643 and another adjacent third groove 643 may be connected to each other.

When one light source 125b is disposed to correspond to the plurality of first patterns 640 as described above, the number of times the light incident on the light guide plate 320 from the light source 125b meets the first patterns 640 may be increased. Therefore, the directional angle of the light incident from the light source 125b to the light guide plate 320 can be further increased.

The patterns illustrated in FIG. 9 differ from the first patterns 640 illustrated in FIG. 8 in that an arrangement of other third patterns 740 (hereinafter, referred to as a "third pattern arrangement") is disposed adjacent to the first patterns 640. At this time, the third pattern 740 arrangement may be disposed on one side of the first pattern 640 arrangement. At this time, the plurality of first patterns 640 disposed adjacent to the light sources 125b may be connected to each other in the direction in which the light sources 125b are aligned, and the plurality of third patterns 740 may also be connected to each other in the direction in which the light sources 125b are aligned. Here, the third patterns 740 may have the same shape as the first patterns 640, but the present aspect is not limited thereto. For example, the third patterns 740 may have the shape of the first patterns according to the first aspect.

Meanwhile, one third pattern 740 may be disposed between adjacent first patterns 640. As a result, the light incident from the light sources 125b can be primarily improved in the directional angle by the first pattern 640, and the light with the improved directional angle can be further improved in the directional angle by meeting the third pattern 740. That is, the density of the patterns disposed in the first region 321 of the light guide plate 320 can be improved, and as a result, the directional angle of the light incident on the light guide plate 320 can be further increased. Although FIG. 9 illustrates a configuration in which two first pattern 640 arrangements are provided, the present aspect is not limited to this, and three or more arrangements, in each of which a plurality of first patterns 640 are connected to each other, may be provided.

Figure 10:
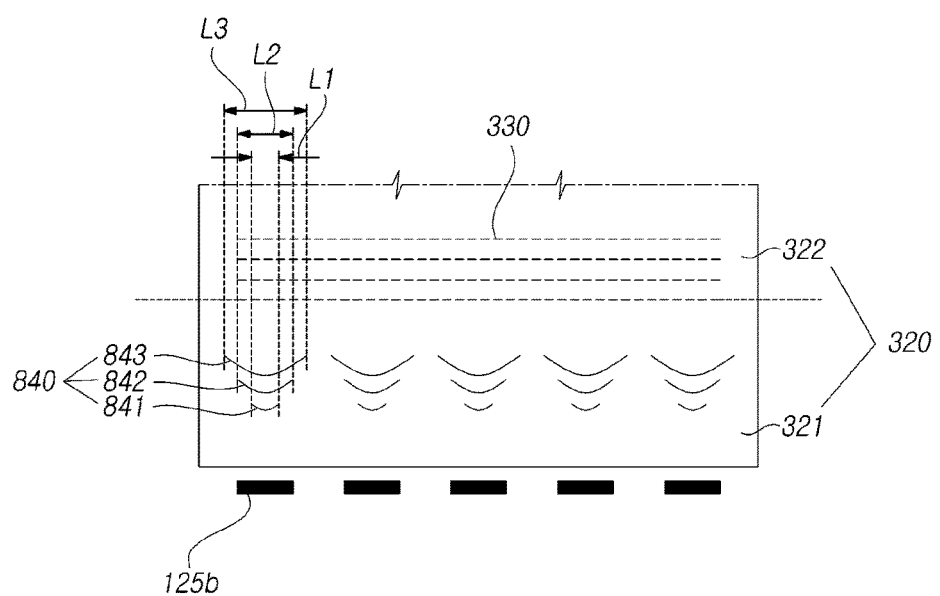
FIG. 10 is a plan view illustrating a portion of a light guide plate and light sources according to a sixth aspect.
Figure 11:
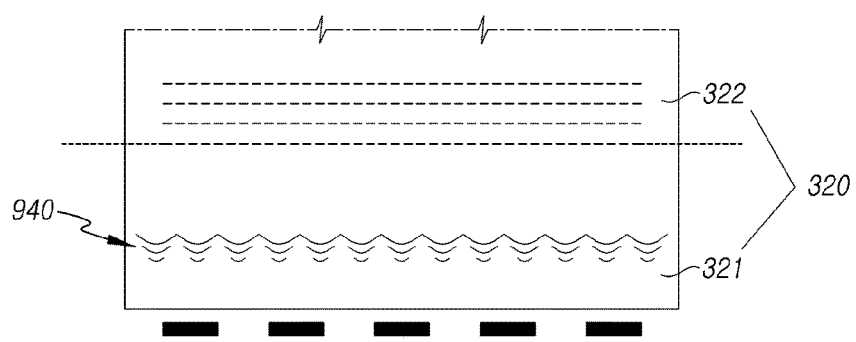
FIG. 11 is a plan view illustrating a portion of a light guide plate and light sources according to a seventh aspect.
Figure 12:
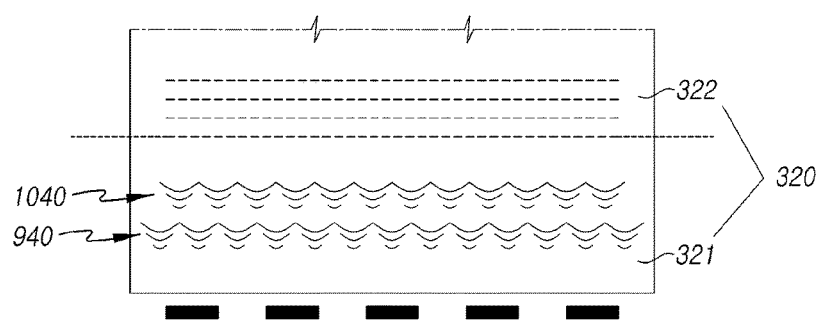
FIG. 12 is a plan view illustrating a portion of a light guide plate and light sources according to an eighth aspect.

Subsequently, a first pattern according to another aspect will be described as follows. FIG. 10 is a plan view illustrating a portion of a light guide plate and light sources according to a sixth aspect. FIG. 11 is a plan view illustrating a portion of a light guide plate and light sources according to a seventh aspect. FIG. 12 is a plan view illustrating a portion of a light guide plate and light sources according to an eighth aspect.

The display device illustrated in FIGS. 10 to 12 may include similar components as those of the above-described aspects. Similar descriptions of the above-described aspects may be omitted. Similar components may be denoted by the same reference numerals.

First, referring to FIG. 10, a first pattern 840 according to the sixth aspect may include a first groove 841 positioned closest to the light sources 125b, a second groove 842 positioned on one side of the first groove 841, and a third groove 843 positioned on one side of the second groove 842. At this time, each of the first groove 841, the second groove 842, and the third groove 843 may have a concavely curved shape in a plan view, but the present aspect is not limited thereto. However, it may be sufficient to configure the first pattern 840 such that among the plurality of grooves forming the first pattern 840, a groove disposed closer to the light sources 125b has a smaller width and a groove disposed farther away from the light sources 125b has a greater width.

Through this, the light incident on the light guide plate 320 from the light sources 125b reaches the interface between the first groove 841 of the first pattern 840 and the air, thereby being reflected and refracted, so that the directional angle of the light can be improved. At this time, since the width L1 of the first groove 841 is smaller than the widths L2 and L3 of the other grooves 842 and 843, the directional angle of the light incident on the light guide plate 320 from the light sources 125b can be increased by the first groove 841, and the light, the directional angle of which has been increased by the first groove 841, may have a further increased directional angle through the second groove 842 and the third groove 843.

As compared with FIG. 10, the configuration illustrated in FIG. 11 differs from that of FIG. 10 in that a plurality of first patterns 940 are connected in the same direction as the direction in which the plurality of light sources 125b are aligned. As illustrated in FIG. 11, the present aspect may provide a configuration, in which among a plurality of grooves in the first patterns 940, the grooves disposed adjacent to each other in the same arrangement (for example, the arrangement farthest away from the light sources) are connected to each other. In addition, the patterns illustrated in FIG. 12 differ from the first patterns 940 illustrated in FIG. 11 in that another third pattern 1040 arrangement is disposed adjacent to the first pattern 940 arrangement.

As described above, it can be seen that, in the aspects disclosed herein, the first patterns arranged in the first region 321 of the light guide plate 320 may have various shapes and various arrangements.

Figure 13:
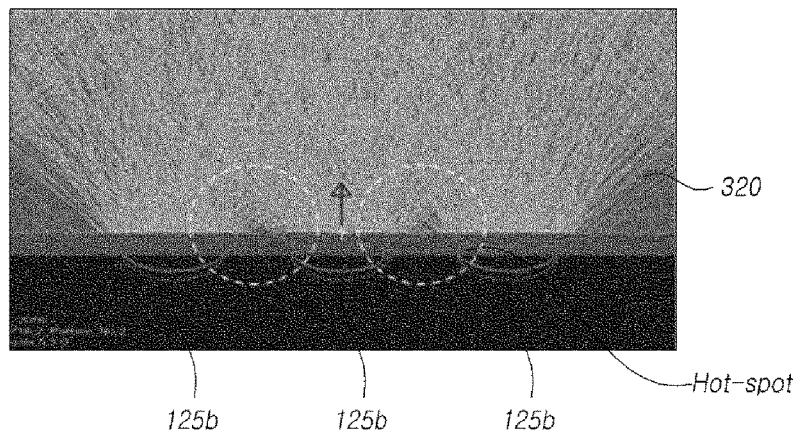
FIG. 13 is an image showing hot spots occurred in a light guide plate according to a comparative example.
Figure 14:
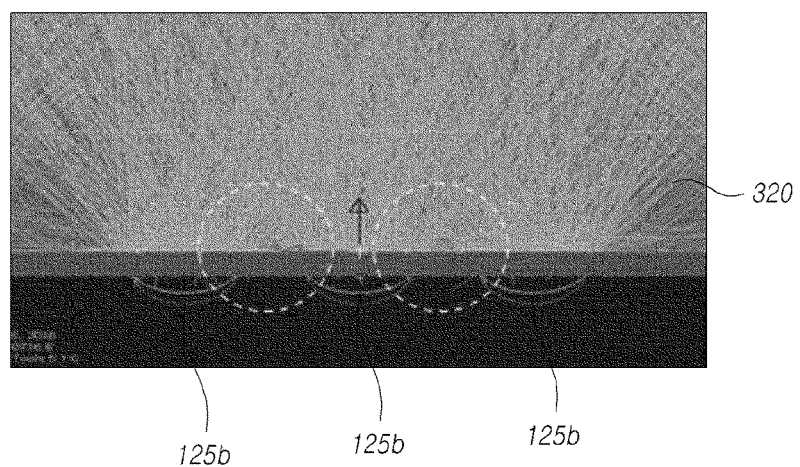
FIG. 14 is an image showing no hot spots occurred in the light guide plate according to the first aspect.

Next, with reference to FIGS. 13 and 14, a light guide plate according to a comparative example and the light guide plate according to the first aspect will be compared to each other to confirm if hot spots occur. FIG. 13 is an image showing hot spots occurred in a light guide plate according to a comparative example. FIG. 14 is an image showing no hot spots occurred in the light guide plate according to the first aspect. Here, the light guide plate according to the comparative example is a light guide plate that is only provided with a pattern corresponding to the second pattern of the first aspect on the rear surface of the light guide plate.

Referring to FIGS. 13 and 14, in the light incidence portion of the light guide plate 320 according to the comparative example, it can be seen that hot spots occur in a region corresponding to a region between each adjacent light sources 125b. Meanwhile, in the light incidence portion of the light guide plate 320 according to the first aspect, the occurrence of the hot spots is prevented in a region corresponding to the region between adjacent light sources 125b.

Figure 15:
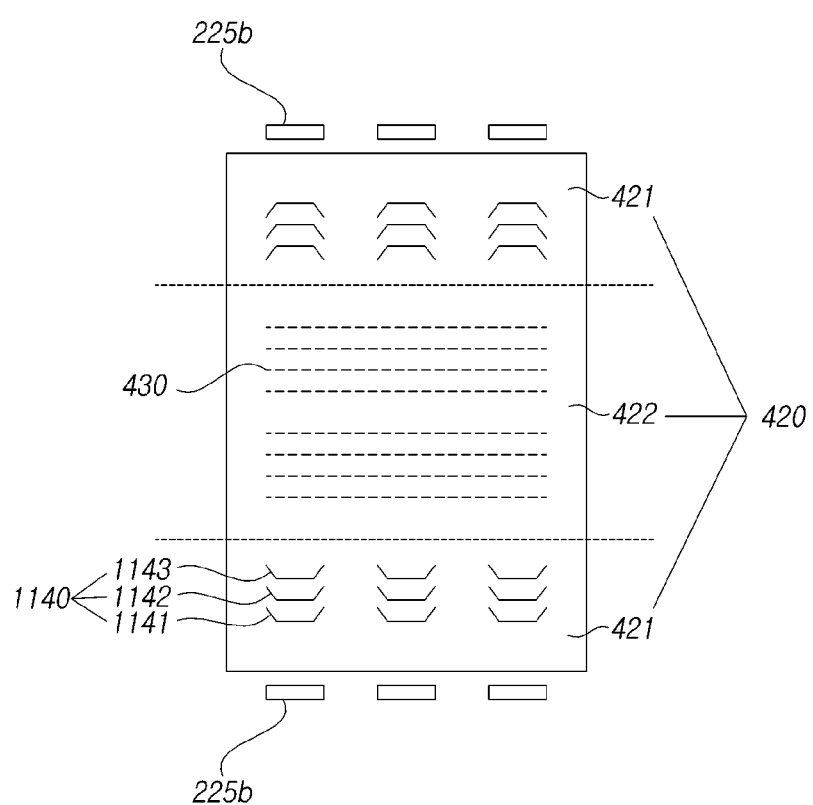
FIG. 15 is a plan view illustrating a portion of a light guide plate and light sources according to a ninth aspect.

Next, a portion of a backlight unit and light sources according to the ninth aspect will be described with reference to FIG. 15. FIG. 15 is a plan view illustrating a portion of a light guide plate and light sources according to a ninth aspect. The configuration illustrated in FIG. 15 may include the same components as those of the above-described aspect. Similar descriptions of the above-described aspects may be omitted.

Referring to FIG. 15, the light guide plate 420 according to the ninth aspect includes first regions 421 provided in two side surfaces, which face each other, and a second region 422 provided between the first regions 421. In this case, the first regions 421 may be provided with a light incidence surface.

On the other hand, light sources 225b may be disposed on two opposite sides facing the light guide plate 420 according to the ninth aspect. Accordingly, the light guide plate 420 has two light incidence surfaces from which light is incident from the light sources 225b. Accordingly, the light guide plate 420 may have a first region 421 on each of two side surfaces each having a light incidence surface.

At this time, the first region 421 may be provided with a plurality of first patterns 1140, and the second region 422 may be provided with a plurality of second patterns 430. At this time, the engraved depth of the first patterns 1140 may be deeper than the engraved depth of the second patterns 430. Although FIG. 15 illustrates a configuration in which one first pattern 1140 is arranged to correspond to one light source 225b, the present aspect is not limited thereto.

In addition, each of a plurality of first patterns 1140 may include a first groove 1141 disposed closest to the light sources 225b, a second groove 1142 disposed on one side of the first groove 1141, and a third groove 1143 disposed on one side of the second groove 1142, but the present disclosure is not limited thereto. In addition, the widths of the first to third grooves 1141, 1142, and 1143 with respect to the direction in which the light sources 225b are aligned may be the same as or different from each other.

When a plurality of light sources 125b are disposed on two opposite sides of the light guide plate 420 as described above, the directional angle of the light incident on the light guide plate 420 can be increased through the plurality of first patterns 1140 provided in the first region 421 of the light guide plate 420.

A light guide plate according to the above-described aspects includes a first region having a light incidence surface and a second region extending from the first region. In this case, the first region may have a first pattern, the second region may have a second pattern, and the engraved depth of the first pattern may be deeper than the engraved depth of the second pattern. As a result, the light incident on the first region of the light guide plate is reflected and refracted by a plurality of first patterns so that the directional angle of the light can be improved, thereby preventing the occurrence of hot spots in the light guide plate.

The features, structures, and effects described in the above-described exemplary aspects are included in at least one exemplary aspect of the present disclosure, but are not limited only to any one exemplary aspect. Further, the features, structures, and effects exemplified in each exemplary aspect may be embodied by being combined with another exemplary aspect or modified by those skilled in the art. It should be interpreted that the combined and modified contents are included in the scope of the present disclosure.

In the above description, the present disclosure has been described based on the exemplary aspects, but the exemplary aspects are for illustrative, and do not limit the present disclosure, and those skilled in the art will appreciate that various modifications and applications, which are not exemplified in the above description, may be made without departing from the scope of the essential characteristic of the present disclosure. For example, each component described in detail in the exemplary aspects can be modified.

What is claimed is:

1. A backlight unit comprising:
   a light guide plate including at least one first region including a light incidence surface and a second region extended away from the first region; and
   a light source assembly including a plurality of light sources disposed on at least one side of the light guide plate adjacent to the first region,
   wherein the first region and the second region include a plurality of first patterns and a plurality of second patterns, respectively, the first patterns and the second patterns are depressed engraving patterns, and the first patterns have a depth deeper than a depth of the second patterns.

2. The backlight unit of claim 1, wherein one of the plurality of first patterns is disposed to correspond to one of the plurality of light sources.

3. The backlight unit of claim 1, wherein each of the plurality of first patterns is disposed to correspond to each of the plurality of light sources.

4. The backlight unit of claim 3, wherein the depressed engraving patterns of the plurality of first patterns are connected to each other and increase a directional angle of the light incident surface of the light guide plate.

5. The backlight unit of claim 1, further comprising:
   a first arrangement of the first patterns in which the first patterns are arranged in the first region of the light guide plate in the direction in which the plurality of light sources are arranged; and
   at least one second arrangement of the first patterns, which is disposed on one side of the first arrangement, the first patterns in the at least one second arrangement being arranged in the direction in which the plurality of light sources are arranged.

6. The backlight unit of claim 5, wherein one of the first patterns disposed in the second arrangement is disposed between a first pattern disposed in the first arrangement and another first pattern adjacent to the first pattern.

7. The backlight unit of claim 1, wherein the first patterns have a plurality of grooves that are disposed to be spaced apart from each other, and widths of the plurality of grooves are different from each other in the direction in which the plurality of light sources are arranged.

8. The backlight unit of claim 7, wherein the widths of the plurality of grooves are formed such that a groove disposed farther away from the light sources has a greater width, or a groove disposed closer to the light sources has a greater width.

9. The backlight unit of claim 1, wherein the first region of the light guide plate has an area smaller than the second region.

10. The backlight unit of claim 1, wherein the first region is provided in a region corresponding to two facing side surfaces of the light guide plate, and the second region is positioned between the first regions.

11. The backlight unit of claim 1, wherein the first patterns are formed in at least one of a polygonal shape, a concavely curved shape, and a convexly curved shape in a plan view.

12. The backlight unit of claim 1, wherein the second patterns are formed in at least one of a semicircular shape, a semi-elliptical shape, an elliptical shape, and a polygonal shape in a plan view.

13. The backlight unit of claim 1, wherein the first patterns increase a directional angle of the light incident surface of the light guide plate and the second patterns convert a line light source incident on the light guide plate into a plane light source.

14. A backlight unit comprising:
   a light guide plate including at least one first region including a light incidence surface and a second region extended away from the first region; and
   a light source assembly including a plurality of light sources disposed on at least one side of the light guide plate adjacent to the first region,
   wherein the first region includes a plurality of first patterns arranged in a direction in which the plurality of light sources are arranged, one of the first patterns includes a plurality of grooves disposed to be spaced apart from each other, and widths of the plurality of grooves are different from each other in the direction in which the plurality of light sources are arranged.

15. A backlight unit comprising:
   a light guide plate disposed on a rear surface of the display panel, and including at least one first region including a light incidence surface and a second region extended away from the first region; and
   a light source assembly including a plurality of light sources disposed on at least one side of the light guide plate adjacent to the first region,
   wherein each of the first region and the second region includes a plurality of first patterns and a plurality of second patterns arranged in a direction in which the plurality of light sources are arranged, the first patterns and the second patterns are depressed engraving patterns, and the first patterns increase a directional angle of the light incident surface of the light guide plate and the second patterns convert a line light source incident on the light guide plate into a plane light source.

16. The backlight unit of claim 15, wherein one of the first patterns is disposed to correspond to one of the light sources.

17. The backlight unit of claim 15, wherein the plurality of the first patterns are disposed to correspond to one of the light sources.

18. The backlight unit of claim 17, wherein the plurality of first patterns are arranged in the direction in which the plurality of light sources are arranged, and the plurality of first patterns are connected to each other.

19. The backlight unit of claim 15, further comprising:
a first arrangement of the first patterns in which the first patterns are arranged in the first region of the light guide plate in the direction in which the plurality of light sources are arranged; and
at least one second arrangement of the first patterns, which is disposed on one side of the first arrangement, the first patterns in the at least one second arrangement being arranged in the direction in which the plurality of light sources are arranged.

20. The backlight unit of claim 19, wherein one of the first patterns disposed in the second arrangement is disposed between a first pattern disposed in the first arrangement and another first pattern adjacent to the first pattern.

\* \* \* \* \*